United States Patent
Watanabe

(10) Patent No.: US 11,235,426 B2
(45) Date of Patent: Feb. 1, 2022

(54) METHOD FOR FORMING TAB AND APPARATUS THERFOR

(71) Applicant: O.M.C. CO., LTD., Takatsuki (JP)

(72) Inventor: Shinji Watanabe, Takatsuki (JP)

(73) Assignee: O.M.C. CO., LTD., Osaka (JP)

( * ) Notice: Subject to any disclaimer, the term of this patent is extended or adjusted under 35 U.S.C. 154(b) by 403 days.

(21) Appl. No.: 16/017,420

(22) Filed: Jun. 25, 2018

(65) Prior Publication Data

US 2018/0304410 A1 Oct. 25, 2018

Related U.S. Application Data

(62) Division of application No. 15/561,785, filed as application No. PCT/JP2016/000043 on Jan. 6, 2016, now Pat. No. 10,981,249.

(51) Int. Cl.
 *B23K 26/38* (2014.01)
 *B23K 26/06* (2014.01)
 (Continued)

(52) U.S. Cl.
 CPC .......... *B23K 26/38* (2013.01); *B23K 26/0604* (2013.01); *B23K 26/08* (2013.01);
 (Continued)

(58) Field of Classification Search
 CPC ............................ B23K 26/38; B23K 26/0604
 (Continued)

(56) References Cited

U.S. PATENT DOCUMENTS

| | | | |
|---|---|---|---|
| 9,694,445 B2 * | 7/2017 | Chen | B23K 26/0846 |
| 2006/0118529 A1 * | 6/2006 | Aoki | B23K 26/16 |
| | | | 219/121.67 |

(Continued)

FOREIGN PATENT DOCUMENTS

| | | |
|---|---|---|
| CN | 104755219 A | 7/2015 |
| JP | 09-295297 A | 11/1997 |

(Continued)

OTHER PUBLICATIONS

USPTO, Office Action from the related U.S. Appl. No. 15/561,785, dated Jun. 30, 2020.

(Continued)

*Primary Examiner* — Ibrahime A Abraham
*Assistant Examiner* — Ahmad Abdel-Rahman
(74) *Attorney, Agent, or Firm* — Lucas & Mercanti, LLP

(57) ABSTRACT

Provided is an apparatus for forming a tab from a moving original sheet with a laser beam. This apparatus is a tab forming apparatus in a tabbed electrode sheet producing apparatus (100) for moving, in one direction, an original sheet (1) including an electrode portion (1*a*) obtained by applying an active material layer to a long metal foil (4) and an ear portion (1*b*). This tab forming apparatus includes: a laser emission device (50) configured to apply a laser beam (L1) to the moving ear portion (1*b*) to cut out a tab (5) connected to the electrode portion (1*a*); an ear portion separating portion (70) provided at a position above or below a moving plane on which the electrode portion (1*a*) moves, on a downstream side of an irradiation point (Pm) of the laser beam (L1), so as to cause a take-up angle (α) to occur at the irradiation point (Pm) between the ear portion (1*b*) from which the tab (5) has been cut out and the moving plane; and an ear portion collection portion (80) configured to collect the ear portion (1*b*) in synchronization with the movement of the original sheet (1), while applying tension to the ear portion (1*b*) from which the tab (5) has been cut out with the laser beam L1.

1 Claim, 9 Drawing Sheets

(51) Int. Cl.
*B23K 26/08* (2014.01)
*B23K 26/402* (2014.01)
*B23K 37/02* (2006.01)
*B23K 101/18* (2006.01)
*B23K 101/16* (2006.01)
*B23K 101/36* (2006.01)
*B23K 103/10* (2006.01)
*B23K 103/12* (2006.01)
*B23K 103/16* (2006.01)
*B23K 103/18* (2006.01)

(52) U.S. Cl.
CPC ........ *B23K 26/0846* (2013.01); *B23K 26/402* (2013.01); *B23K 37/0247* (2013.01); *B23K 2101/16* (2018.08); *B23K 2101/18* (2018.08); *B23K 2101/36* (2018.08); *B23K 2103/10* (2018.08); *B23K 2103/12* (2018.08); *B23K 2103/172* (2018.08); *B23K 2103/18* (2018.08)

(58) Field of Classification Search
USPC .................................................... 219/121.67
See application file for complete search history.

(56) References Cited

U.S. PATENT DOCUMENTS

2016/0263705 A1* 9/2016 Kim ................... B23K 26/0622
2017/0012262 A1  1/2017 Lanciotti et al.

FOREIGN PATENT DOCUMENTS

| | | |
|---|---|---|
| JP | H09306481 A | 11/1997 |
| JP | H09312156 A | 12/1997 |
| JP | H106126 A | 1/1998 |
| JP | H11185734 A | 7/1999 |
| JP | 2002178187 A | 6/2002 |
| JP | 2003227062 A | 8/2003 |
| JP | 2014210277 A | 11/2014 |
| JP | 5724137 B2 | 4/2015 |
| KR | 10-2013-0098740 A | 9/2013 |
| KR | 10-2015-0062839 A | 6/2015 |
| WO | 2014041588 A1 | 3/2014 |

OTHER PUBLICATIONS

KIPO, Office Action dated Aug. 22, 2019 from the corresponding Korean Patent Application No. 10-2018-7020872 (6 pages; English translation not available).

International Search Report dated Apr. 12, 2016 for Application No. PCT/JP2016/0000443 and English translation.

KIPO, Office Action dated Aug. 22, 2019 from the corresponding Korean Patent Application No. 10-2018-7021002 (5 pages; English translation not available).

Communication pursuant to Article 94(3) EPC dated Aug. 28, 2020 from the corresponding European Patent Application No. 18180024.4-1016.

Office Action dated Nov. 1, 2019 from the corresponding Chinese Patent Application No. 201810657061.3 and an English translation.

* cited by examiner

METHOD FOR FORMING TAB AND APPARATUS THERFOR

CROSS-REFERENCE TO RELATED APPLICATIONS

The present application is a Divisional Application of U.S. patent application Ser. No. 15/561,785, filed Sep. 26, 2017, which is a 371 of International Application PCT/JP2016/000043 filed on Jan. 6, 2016, the priorities of both applications is claimed and both applications are incorporated herein by reference.

TECHNICAL FIELD

The present invention relates to a method for forming a tab by cutting out from an ear portion of an original sheet to be used in a lithium secondary battery, a lithium capacitor, an electric double layer capacitor, or the like, and an apparatus therefor.

BACKGROUND ART

Nonaqueous electrolytic solution secondary batteries typified by lithium ion secondary batteries have been used in storage batteries for small electronic apparatuses such as mobile phones and personal computers and for large apparatuses such as hybrid or electric vehicles, since these secondary batteries have the merit of having a high energy density. Electrode assemblies that are main internal structures of lithium ion secondary batteries are a lamination type in which separators and positive and negative electrode sheets each obtained by cutting an original sheet into a rectangular shape are alternately laminated. The lamination type electrode assembly is housed in an outer can as a container, and an electrolytic solution is injected thereinto. Then, a cap is attached to seal the outer can, and initial charge is finally performed to impart a function as a battery. The above lithium capacitor and electric double layer capacitor also have the same structure. The thus formed lamination type secondary battery or the like (hereinafter, referred to merely as an electronic component) has a rectangular parallelepiped appearance.

Here, the original sheet to be used for the above electronic component will be briefly described. The original sheet includes: an electrode portion in which a positive or negative active material is applied to one surface or both surfaces of a metal foil such as aluminum or copper in the form of a band so as to have a wide width; and a non-electrode portion (referred to as an ear portion) that is provided at each of both sides or one side of the electrode portion and on which no active material is applied. In general, the original sheet is wound in the form of a roll. In other words, there are various types of original sheets, such as original sheets provided with an ear portion at each of both sides or only one side, original sheets having a wide electrode portion, and original sheets having a narrow electrode portion, according to use.

Conventionally, electrode sheets of a lamination type electronic component are stamped from the electrode portion of the wide original sheet as described above with a Thomson blade (a stamping mold having a shape corresponding to that of the electrode sheet) into positive or negative electrode sheets, the positive and negative electrode sheets are laminated alternately between separators, and also tabs for the same pole are connected to each other, to form a laminate (lamination type electrode assembly) for the electronic component. However, when electrode sheets are cut out with the Thomson blade as described above, burrs easily occur at cut ends. Thus, the following problems have been pointed out.

In the case where the electrode sheets and the separators are laminated and used as an electrode assembly of a battery, the battery slightly and repeatedly expands and contracts due to charging and discharging. Thus, the burrs may repeatedly damage the separator, which is an insulating film, to cause flaws thereon to grow, or the burrs may grow, due to the charging and discharging, to break through the separator to cause insulation breakdown, which causes trouble.

In addition, since stamping of electrode sheets with the Thomson blade has to be performed while the original sheet is stopped, the original sheet has to be fed intermittently. Thus, there is also a problem of low productivity.

Furthermore, the sizes of the electrode sheets, the positions of tabs, and the shapes of the tabs widely vary depending on specifications, and in the case of stamping with the Thomson blade, the mold and the Thomson blade have to be prepared for each type of electrode sheets. Thus, there has been a complaint from the production site that the mold cost increases and the management of the molds inevitably becomes complicated.

In such a situation, a method for cutting a positive or negative electrode sheet from an original sheet by using a laser beam has been recently proposed (Patent Literature 1).

An apparatus disclosed in Patent Literature 1 includes a frame, a laser cutter, a cutting mechanical arm for driving the laser cutter, a control system, and at least one electrode sheet conveying mechanism, and the electrode sheet conveying mechanism includes a material holding mechanical arm, a fixed length feeding member, and a material setting member.

This apparatus achieves production of electrode sheets of lithium ion batteries or super capacitors by cutting an intermittently-fed original sheet into a predetermined dimension by using a laser technique. Thus, a problem of deformation or burrs of an electrode sheet that cannot be avoided with the traditional cutting method using the Thomson blade in the conventional art can be solved. As a result, the qualities of the produced electrode sheets are improved, so that the yield can be increased.

CITATION LIST

Patent Literature

[PTL 1] Japanese Patent No. 5724137

SUMMARY OF INVENTION

Here, regarding cutting of an original sheet by using a laser beam, the original sheet is cut by causing the laser beam to traverse over the original sheet while the laser beam is applied thereto. With a special laser beam that evaporates a metal foil at an irradiation spot, the original sheet can be cut when the laser beam is caused to traverse over the original sheet. With a normal single mode laser, the metal foil of the original sheet instantaneously melts at an irradiation spot, but does not evaporate (vaporize). Thus, when the irradiation spot moves to the next irradiation position, the melting portion instantaneously becomes solidified due to its heat being taken by the surroundings, so that the cut portion becomes rejoined. As a result, the original sheet is not sufficiently cut, and its appearance is similar to that in the case where the laser beam merely traverses over the original sheet.

The present invention has been made in view of the above problems, and an object of the present invention is to provide a method capable of forming a tab by cutting out from an ear portion of a moving original sheet with a laser beam, and an apparatus therefor.

Solution to Problem

An invention recited in item 1 (FIG. 1) is a tab forming apparatus in a tabbed electrode sheet producing apparatus 100 for moving, in one direction, an original sheet 1 including an electrode portion 1a obtained by applying an active material layer to a long metal foil 4 along a longitudinal direction thereof and an ear portion 1b formed between the electrode portion 1a and a side end edge 4a of the metal foil 4, the tab forming apparatus including:

a laser emission device 50 configured to apply a laser beam L1 to the moving ear portion 1b to cut out a tab 5 connected to the electrode portion 1a;

an ear portion separating portion 70 provided at a position above or below a moving plane on which the electrode portion 1a moves, on a downstream side of an irradiation point Pm of the laser beam L1 applied to cut out the tab 5, so as to cause a take-up angle α to occur at the irradiation point Pm between the ear portion 1b from which the tab 5 has been cut out and the moving plane; and an ear portion collection portion 80 configured to collect the ear portion 1b in synchronization with the movement of the original sheet 1, while applying tension to the ear portion 1b from which the tab 5 has been cut out with the laser beam L1.

In the present invention, the tab 5 is cut out from the ear portion 1b as appropriate while the ear portion 1b of the original sheet 1 that is running is cut and separated from the electrode portion 1a with the laser beam L1.

An invention recited in item 2 is a method for forming an angular u-shaped or curved u-shaped fusion-cutting line Sy by applying a laser beam L1 to an ear portion 1b of a long original sheet 1 so as to form a tab 5 continuously and integrally with the electrode portion 1a.

More specifically, the invention recited in item 2 is a tab forming method for forming a tab 5 in an ear portion 1b of an original sheet 1 that is being fed in one direction by applying a laser beam L1 to the ear portion 1b, the original sheet 1 including an electrode portion 1a obtained by applying an active material layer to a long metal foil 4 along a longitudinal direction thereof and the ear portion 1b formed between the electrode portion 1a and a side end edge 4a of the metal foil 4, the tab forming method including:

forming, by using an ear portion separating portion 70 provided at a position above or below a moving plane on which the electrode portion 1a moves, on a downstream side of an irradiation point Pm of the laser beam L1 applied to cut out the tab 5, a separation angle α at the irradiation point Pm between the electrode portion 1a on the moving plane and the ear portion 1b from which the tab 5 has been cut out; and separating the ear portion 1b, from which the tab 5 has been cut out, from the electrode portion 1a with the laser beam L1, simultaneously with melting that occurs at the irradiation point Pm of the laser beam L1.

In item 3, in the invention of the method recited in item 2, the tab 5 connected to the electrode portion 1a is cut out and formed from the ear portion 1b by repeating an operation in which:

the laser beam L1 (L1a, L1b) for separating the electrode portion 1a and the ear portion 1b from each other is fixedly applied to the ear portion 1b for a predetermined time;

subsequently, the laser beam L1 (L1a, L1b) is moved in a direction toward a side end edge 4a of the ear portion 1b in synchronization with a moving speed of the ear portion 1b, and then is fixed at a position spaced from the side end edge 4a for a predetermined time;

thereafter, the laser beam L1 (L1a, L1b) is returned within a range of the ear portion 1b in synchronization with the moving speed of the ear portion 1b from the fixed application position spaced from the side end edge 4a in a direction toward the electrode portion 1a having the active material layer applied thereon; and then the laser beam L1 (L1a, L1b) is fixed at a returned position for a predetermined time. Thus, a rectangular tab 5 can be cut out from the ear portion 1b during movement.

Advantageous Effects of Invention

According to the present invention, while the original sheet is continuously fed, the tab can be continuously cut out with the laser beam.

DESCRIPTION OF EMBODIMENTS

Figure 1:
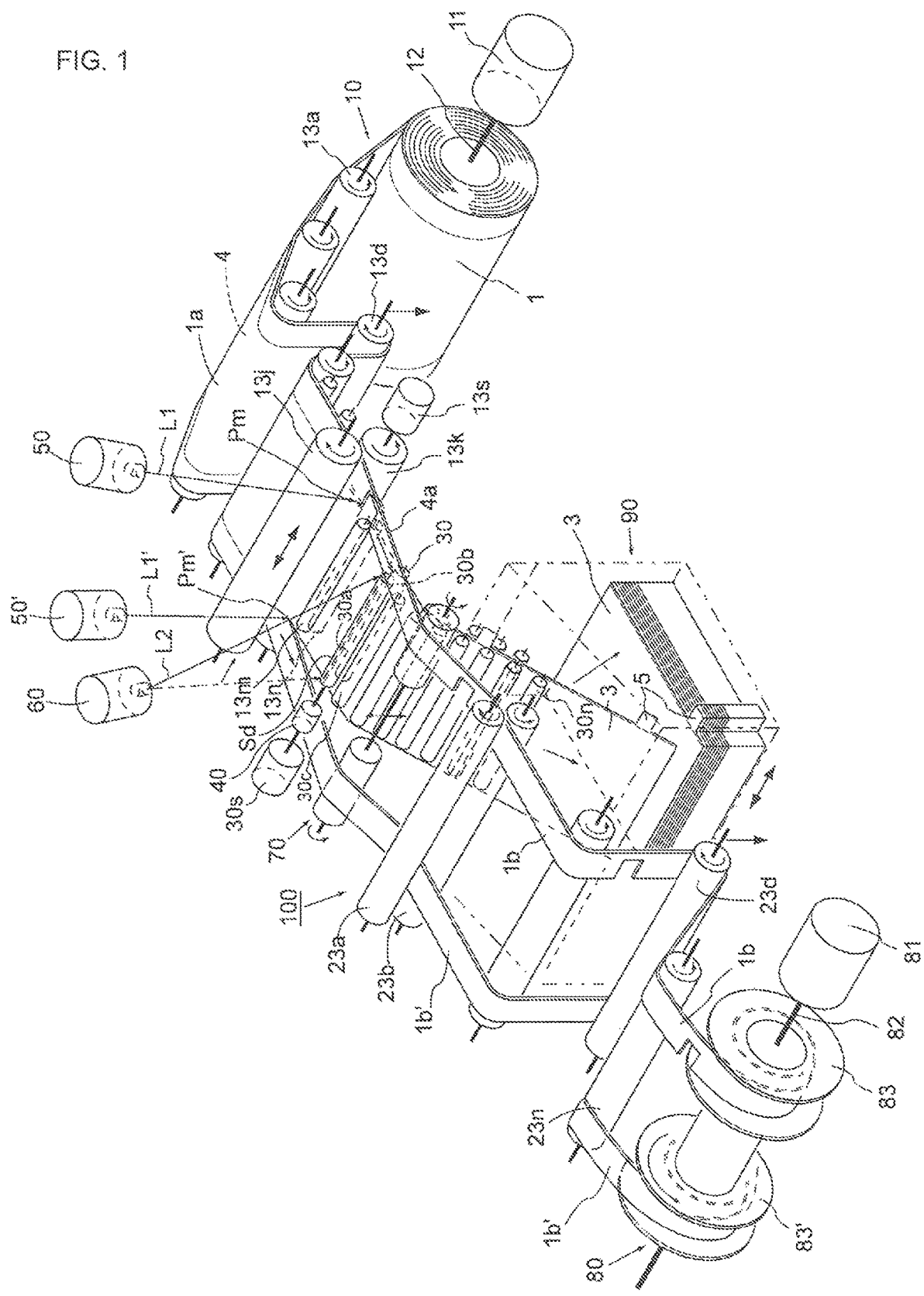
FIG. 1 is a perspective view of a main part of a tabbed electrode sheet producing apparatus (a first embodiment) according to the present invention.
Figure 9:
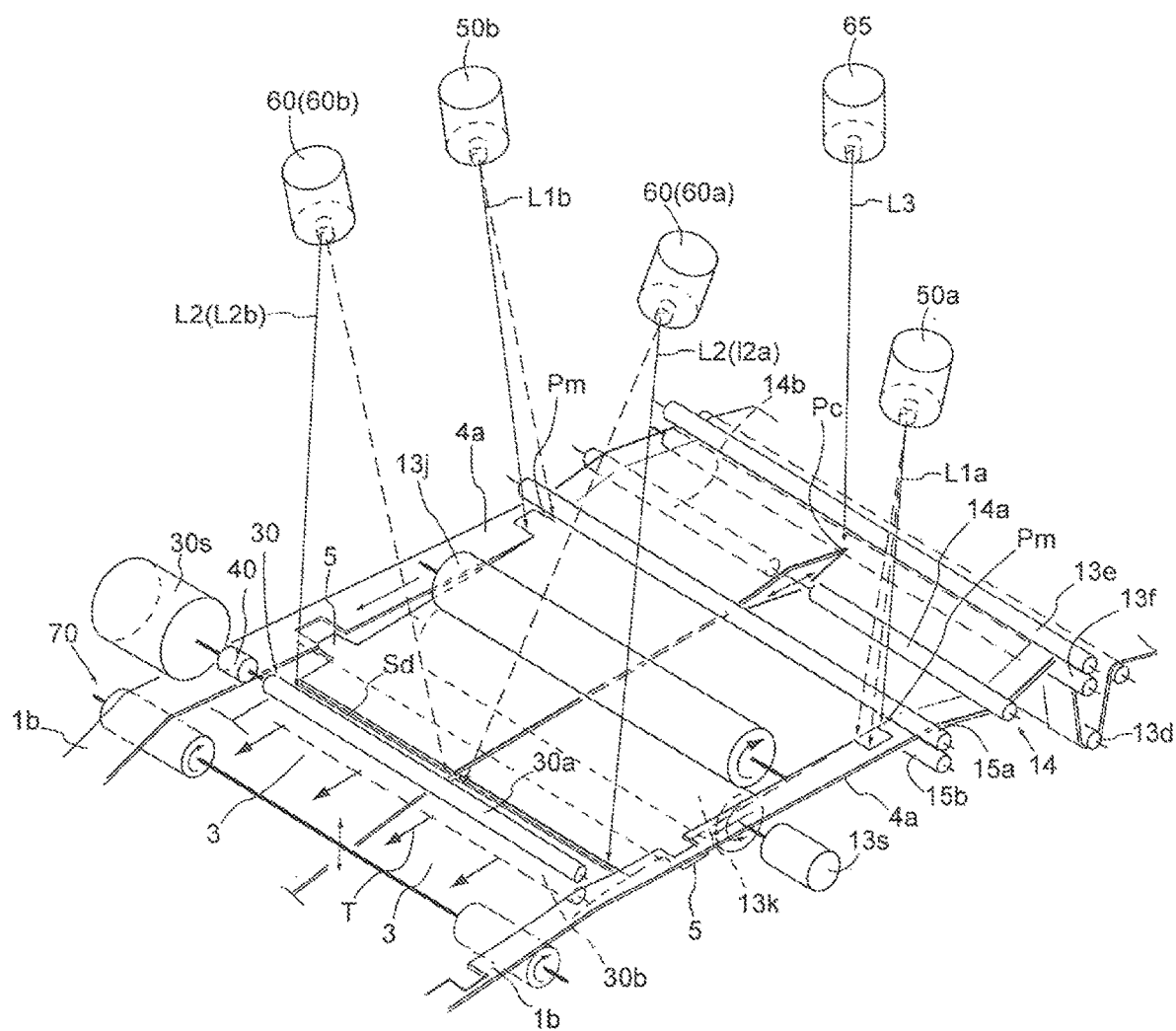
FIG. 9 is a perspective view of a main part of a tabbed electrode sheet producing apparatus (the second embodiment) according to the present invention.

Hereinafter, the present invention will be described by means of illustrated embodiments. A tabbed electrode sheet producing apparatus 100 of the present invention includes an apparatus that cuts out one tabbed electrode sheet 3 from an original sheet 1 in every cutting as shown in FIG. 1 (a first embodiment), and an apparatus that cuts out two tabbed electrode sheets 3 from a wide original sheet 1 in every cutting as shown in FIG. 9 (a second embodiment). Hereinafter, the first embodiment of the apparatus 100 will be described in detail, and the differences from the first embodiment will be mainly described in the second embodiment.

The original sheet 1 in FIG. 1 has ear portions 1b and 1b' at both sides thereof. In the drawing, a tab 5 is cut out from the ear portion 1b at the near side, and the other ear portion 1b' is separated with a laser beam L1' of a laser emission device 50' without cutting out a tab 5 therefrom. In the case where the ear portion 1b is present only at one side of the original sheet 1, which is not shown, the laser emission device 50' becomes unnecessary, the ear portion 1b is separated from an electrode portion 1a while a tab 5 is formed with a laser beam L1 of a first laser emission device 50, and then the electrode portion 1a is cut with a second laser beam L2, whereby an electrode sheet 3 having the tab 5 is continuously formed.

Also in the case where the ear portions 1b are present at both sides of the original sheet 1, the one ear portion 1b may be separated from the electrode portion 1a while a tab 5 is cut out from the one ear portion 1b, and the other ear portion 1b may be left so as to be connected to the electrode portion 1a without being separated therefrom. The shape of the tab 5 is generally a rectangle. However, the shape of the tab 5 is naturally not limited thereto, and other various shapes such as a half moon shape or a triangular shape are selected depending on use.

In the present specification, in order to avoid complication, a wide original sheet, a medium-width original sheet, a narrow original sheet, and an original sheet having an ear portion 1b at one side or each of both sides thereof are collectively referred to as an original sheet 1. An embodiment in FIG. 1 is the case where the ear portions 1b are provided at both sides of the original sheet 1, but the original sheet 1 is naturally not limited thereto.

The tabbed electrode sheet producing apparatus 100 of the first embodiment generally includes, as a mechanism portion, an original sheet supply portion 10, feed side rollers 13a to 13n, a take-up portion 30, laser emission devices 50 and 60 (and the laser emission device 50' provided as necessary), an ear portion collection portion 80, an electrode sheet collection portion 90, and cut material take-up side rollers 23a to 23n, and each component is incorporated into an apparatus frame (not shown).

The original sheet supply portion 10 includes a feed side servomotor 11 that is a feeding side, an original sheet feeding shaft 12 that is connected to the feed side servomotor 11, and an original sheet support stand (not shown). The original sheet 1 that is in the form of a roll and is suspended by the original sheet support stand is mounted to the original sheet feeding shaft 12 and is fed toward the take-up portion 30. The fed original sheet 1 is supported by the feed side rollers 13a to 13n and a support plate 13o that is provided as necessary between the feed side roller 13n at the rearmost end and a later-described cutting line Sd. The feed side rollers 13a to 13n include a publicly-known original sheet side dancing roller 13d that is incorporated at the upstream side of the first laser emission device 50 for adjusting the tension of the original sheet 1 being fed.

A pair of upper and lower original sheet feeding rollers 13j and 13k for feeding the original sheet 1 to the take-up portion 30 side at a fixed speed are installed between the original sheet side dancing roller 13d and the take-up portion 30, and the original sheet 1 is fed at a set speed in the direction toward the take-up portion 30 by an original sheet feeding servomotor 13s that is mounted at the original sheet feeding roller 13k. The original sheet feeding servomotor 13s and the feed side servomotor 11 rotate in synchronization with each other. A change in the tension of the original sheet 1 being fed may occur between the original sheet feeding servomotor 13s and the feed side servomotor 11 for some reason, but the change in the tension is absorbed by the above-described original sheet side dancing roller 13d.

Figure 2:
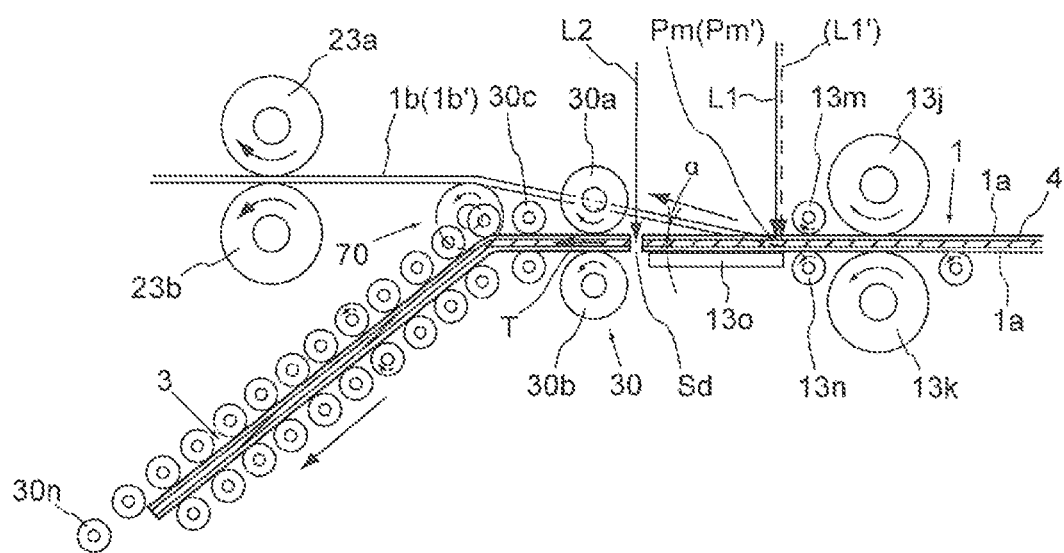
FIG. 2 is an enlarged side view of a take-up portion (the first embodiment) in FIG. 1.
Figure 3:
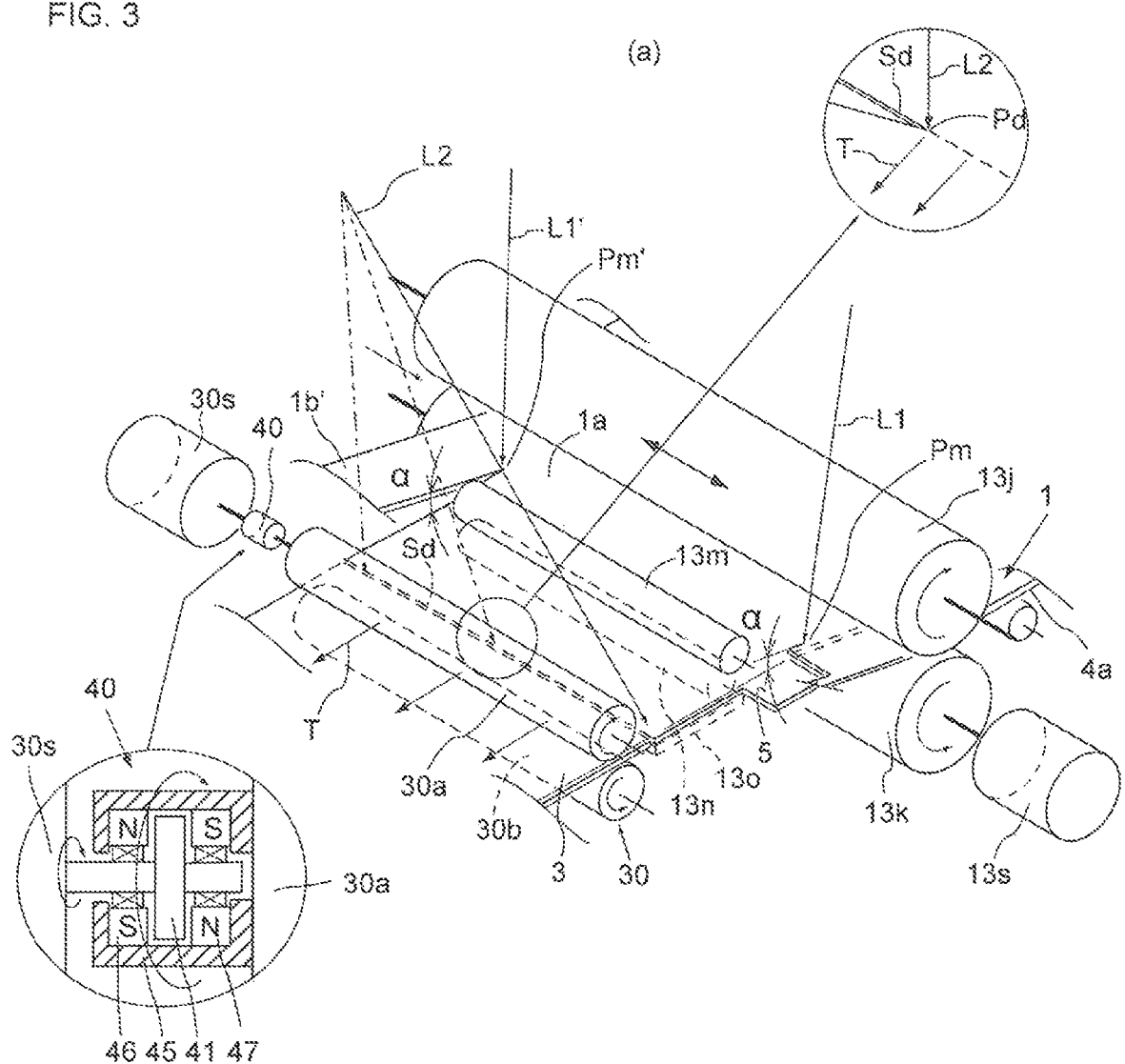
FIG. 3(a) is an enlarged perspective view of the take-up portion in FIG. 2.
FIG. 3(b) is a front view of a permanent magnet of a torque limiter used in the take-up portion.
Figure 3:
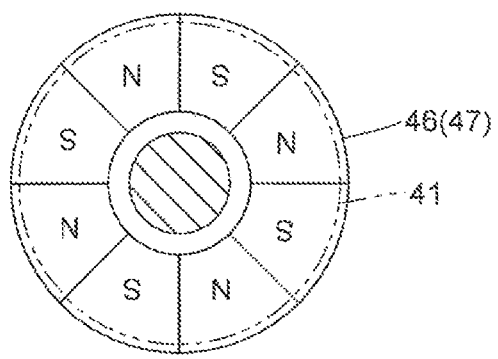

As shown in FIGS. 1 to 3, the first embodiment of the take-up portion 30 includes upper and lower take-up rollers 30a and 30b, upper and lower guide rollers 30c to 30n subsequent to the take-up rollers 30a and 30b, a take-up servomotor 30s, and a torque limiter 40. The upper and lower take-up rollers 30a and 30b are disposed at a right angle relative to the running direction of the electrode portion 1a and immediately in rear of the cutting line Sd along which the electrode portion 1a is to be cut at a right angle. The cutting line Sd is a running trajectory on which the second laser beam L2 slightly obliquely runs from one edge of the electrode portion 1a to the other edge of the electrode portion 1a in synchronization with the running speed of the electrode portion 1a, and the electrode portion 1a is cut at a right angle along the cutting line Sd. The take-up roller 30a is rotationally driven in a take-up direction by the take-up servomotor 30s via the torque limiter 40.

Here, to cut the electrode portion 1a with the second laser beam L2, tension T in the running direction has to be applied to the electrode portion 1a. In other words, tension T in the feed direction is applied to the electrode portion 1a that is nipped between the original sheet feeding rollers 13j and 13k and between the take-up rollers 30a and 30b and has not been cut. Thus, for example, the take-up servomotor 30s is set so as to rotate slightly faster than the original sheet feeding servomotor 13s, and hence the take-up roller 30a connected to a rotation shaft of the take-up servomotor 30s via the torque limiter 40 rotates with a set resisting force relative to the rotation shaft, although not shown. In addition, the torque limiter 40 may not be used, and the take-up servomotor 30s may be a constant-torque servomotor.

The torque limiter 40 is provided between a drive shaft and a driven shaft, and is a device that: when a load applied to the driven shaft is lower than a set value, allows the drive shaft and the driven shaft to rotate integrally; and, when the load applied to the driven shaft exceeds a set torque, causes a slip therein such that the driven shaft is delayed with respect to rotation of the drive shaft and constantly rotates at the set torque. Examples of the torque limiter 40 include various types such as a permanent magnet type and a mechanical type. Here, an outline of the permanent magnet type is shown.

The permanent magnet type torque limiter 40 is schematically configured with a casing 45 that is coaxially fixed to the take-up roller 30a, a pair of ring-shaped permanent magnets 46 and 47 that are fixed to the casing 45 so as to face each other, and a rotation plate 41 that is rotatably disposed between the permanent magnets 46 and 47 and mounted on the rotation shaft of the take-up servomotor 30s. The rotation shaft of the take-up servomotor 30s is inserted through through-holes of the permanent magnets 46 and 47. Each of the permanent magnets 46 and 47 is divided into multiple magnetic domains such that N poles and S poles are arranged therein around the through-hole. Relative to the one permanent magnet 46, the other permanent magnet 47 can rotate, and the magnetic domains of the permanent magnets 46 and 47 opposing each other can be caused to be S poles-N poles as shown in the drawing or the same poles such as N poles-N poles or S poles-S poles that are not shown. When the rotation plate 41 rotates, numerous magnetic force lines present between the permanent magnets 46 and 47 attempt to hinder the rotation of the rotation plate 41. A toque that attempts to hinder the rotation of the rotation plate 41 becomes minimum in the former case, and becomes maximum in the latter case.

As a result, when the pair of upper and lower take-up rollers 30a and 30b which rotate slightly faster than the original sheet feeding rollers 13j and 13k nip the leading end of the electrode portion 1a that has not been cut, a load is simultaneously applied to the take-up rollers 30a and 30b, so that the take-up rollers 30a and 30b rotate at a speed equal to the feed speed of the electrode portion 1a. Meanwhile, since the take-up servomotor 30s rotates slightly faster than the original sheet feeding rollers 13j and 13k, the rotation plate 41, which is mounted on the rotation shaft of the take-up servomotor 30s, rotates faster than the permanent magnets 46 and 47, which are mounted at the take-up roller 30a and within the casing 45.

Accordingly, due to the magnetic force lines between the permanent magnets 46 and 47 in the above principle, the rotation of the rotation plate 41 is hindered by the set torque in a non-contact state. As a result, the take-up rollers 30a and 30b rotate by the set torque at a speed equal to the feed speed of the electrode portion 1a. Thus, tension T in a predetermined feed direction occurs in the electrode portion 1a that has not been cut.

The guide rollers 30c to 30n subsequent to the pair of upper and lower take-up rollers 30a and 30b are spaced apart at a vertical interval corresponding to the thickness of the electrode sheet 3 that has been cut into a predetermined dimension, and are configured to feed the electrode sheet 3, for example, by being driven via a chain, which is not shown. In the present embodiment, the guide rollers 30c to 30n bend downward in the middle of conveyance such that the electrode sheet 3 is directed downward toward the electrode sheet collection portion 90 which is provided below the guide rollers 30c to 30n. The collection of the electrode sheet 3 is not limited to such a method, and a mere slide type or a suction drum type, as described later, may be used.

The laser emission devices 50 and 60, and the laser emission device 50', provided as necessary for mere ear portion separation, of the first embodiment are installed above the original sheet 1 in an ear portion separating region and a cutting region provided at the downstream side of the original sheet side dancing roller 13d or the original sheet feeding rollers 13j and 13k, and emit the laser beam L1, L2, and L1' to predetermined positions on the original sheet 1, respectively. For example, a laser beam obtained by branching a single mode laser beam generated by a single laser device (not shown) is provided to these laser emission devices 50, 60, and 50' via fibers. For the laser emission device 50 that cuts out the tab 5 from the ear portion 1b and the laser emission device 60 that cuts the electrode portion 1a, it is necessary to move the laser beams L1 and L2. For example, a publicly-known galvano type emission device including a galvano scanner having two XY axes and a mirror is used as each of the laser emission devices 50 and 60. Meanwhile, for the laser emission device 50' that merely separates the ear portion 1b from the electrode portion 1a, it is not necessary to move the laser beam L1'. Thus, a fixed type is used as the laser emission device 50'.

The laser emission device 60 for cutting may emit a branch single mode laser beam. However, when thermal effects on an active material during cutting are taken into consideration, a green laser (second to fourth harmonic laser), a picosecond laser, or a femtosecond laser is preferable as the laser emission device 60. The same applies to a laser of the later-described second embodiment for dividing an original sheet into two sections.

Figure 5:
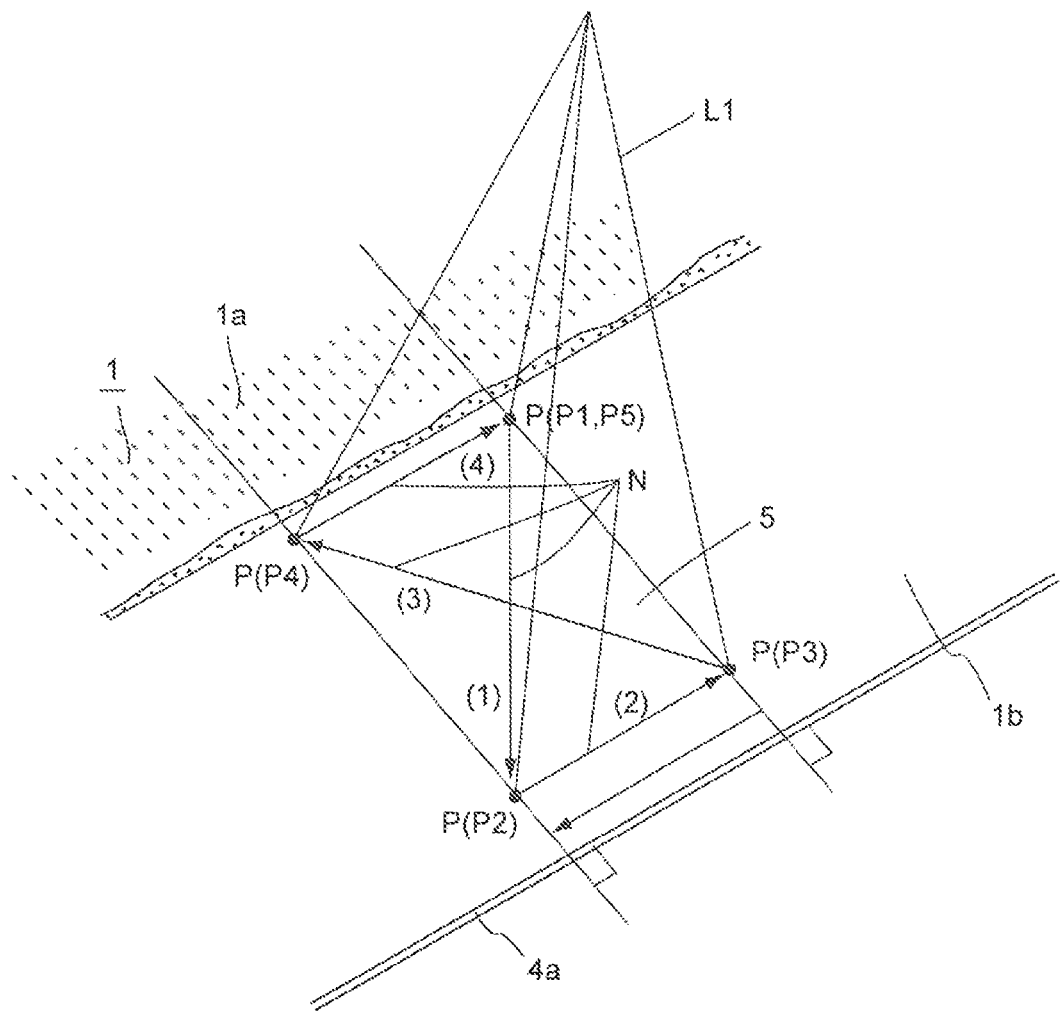
FIG. 5 is a perspective view showing movement of a laser beam when a tab is cut out by the method of the present invention.
Figure 6:
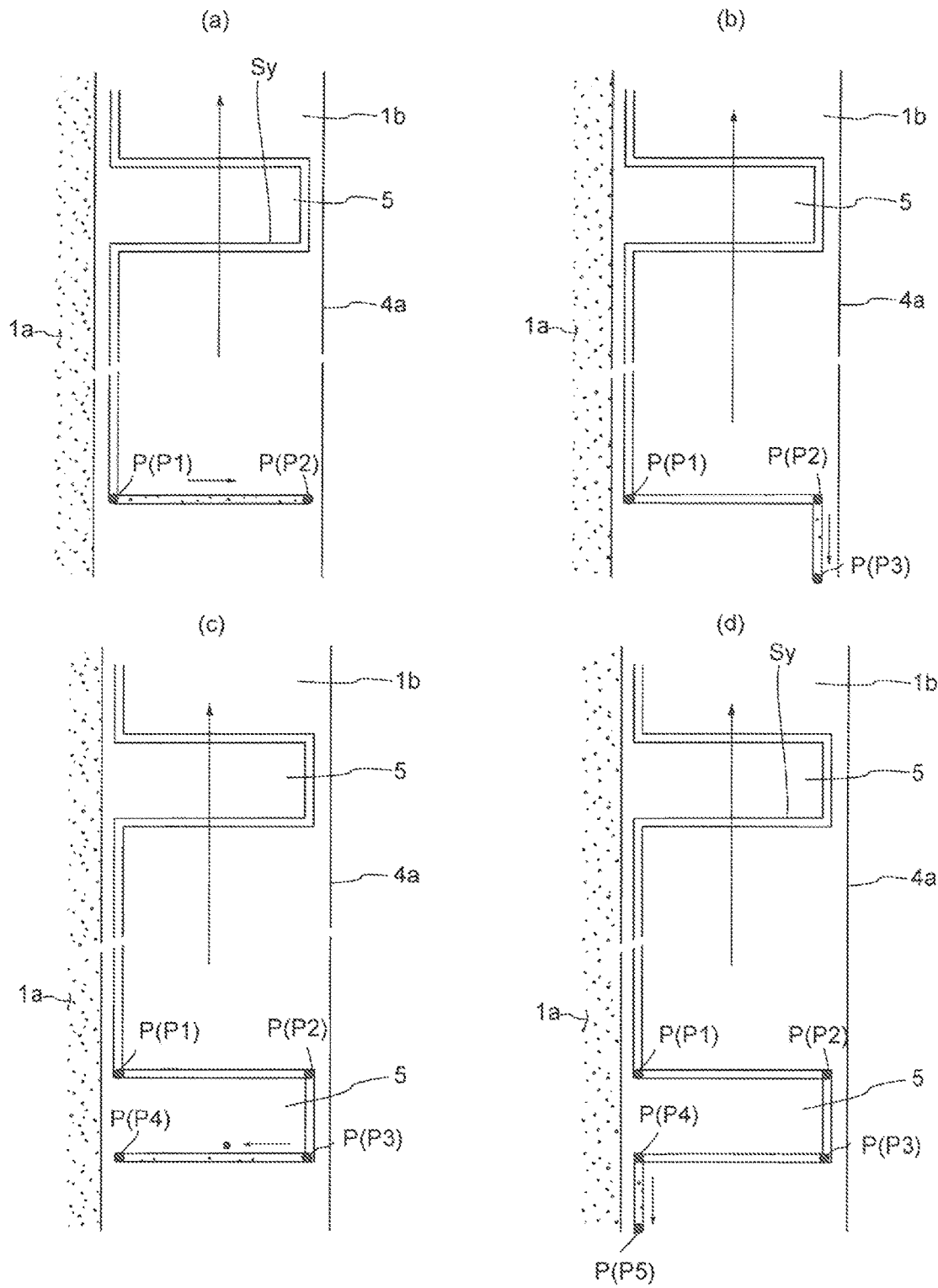
FIG. 6 is a plan view showing movement of the laser beam when the tab is formed by the method of the present invention.

The first laser emission device 50 is installed directly above the ear portion 1b from which the tabs 5 are to be cut out. The shapes of the tabs 5 can have various shapes depending on the specifications of the electrode sheets 3 as described above, but a description will be given with a rectangular or square tab 5 as an example. For forming the rectangular tab 5, movement shown in FIGS. 5 and 6 is provided to the first laser beam L1. That is, the first laser beam L1 moves in a direction crossing the moving direction of the ear portion 1b. Since a fusion-cutting line Sy has to be provided perpendicularly from the side edge of the electrode portion 1a by the laser beam L1 in the present embodiment, the first laser beam L1 reciprocates between the side edge side of the electrode portion 1a and the vicinity of a side end edge 4a of the ear portion 1b while moving in the same direction as that of the ear portion 1b in synchronization with the movement speed of the ear portion 1b, and, for this movement, the first laser beam L1 returns by the moving distance in the direction opposite to the moving direction of the ear portion 1b.

This point will be described in detail with reference to FIG. 5. A line N is a movement trajectory of the first laser beam L1 on the ear portion 1b for forming the tab 5, and each point P is an irradiation point of the laser beam L1 and indicates a movement start point or a direction change point. The movement start point of the laser beam L1 is denoted by P1, and the direction change points of the laser beam L1 are indicated sequentially by P2 to P5 (for easy understanding of movement of the laser beam L1 on the ear portion 1b, the arabic numerals such as P1 and P2 are added in order of movement). This movement is repeated to cut out the tab 5 from the ear portion 1b. Hereinafter, this point will be described in detail.

When cutting-out with the laser beam L1 starts from the movement start point P1, the laser beam L1 obliquely moves in the direction toward the side end edge 4a of the original sheet 1 and in synchronization with the moving direction of the original sheet 1 so as to match the moving speed of the original sheet 1 as shown in FIG. 5 (this movement line N is indicated by (1)).

When the laser beam L1 has reached the direction change point P2 that is a movement end point, the laser beam L1 returns to the direction change point P3 that is a return end point in the direction, opposite to that of the movement of the ear portion 1b, by a distance equal to the movement amount of the ear portion 1b, while the movement of the ear portion 1b is taken into consideration (this movement line N is indicated by (2)). The returning direction is parallel to the side end edge 4a of the ear portion 1b. The line connecting the movement start point P1 and the direction change point P2 is perpendicular to the side end edge 4a.

When the laser beam L1 has reached the direction change point P3, which is the return, end point, the laser beam L1 obliquely moves in the direction toward the electrode portion 1a of the original sheet 1 and in the moving direction of the original sheet 1 in synchronization with the moving speed of the original sheet 1 to reach the direction change point P4 that is a movement end point (this movement line is indicated by (3)). Then, similarly as described above, the line connecting the point P3 and the point P4 is perpendicular to the side end edge 4a.

Figure 4:
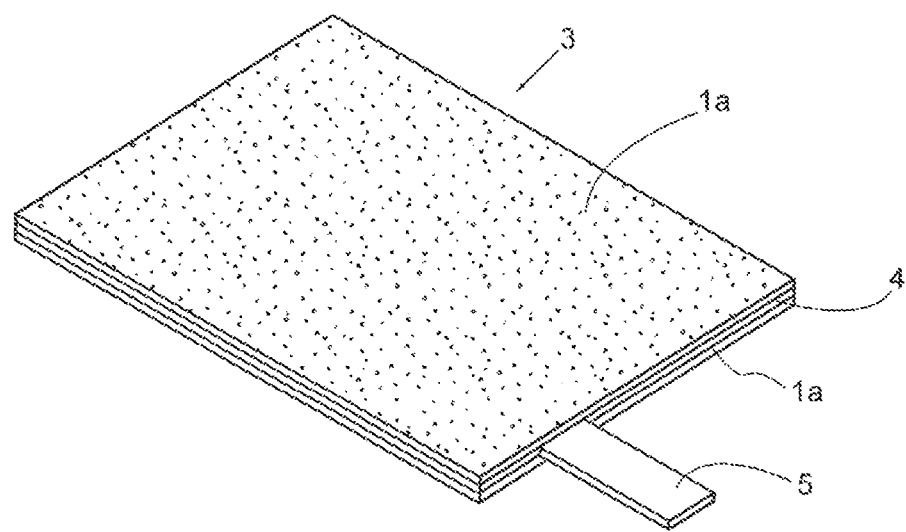
FIG. 4 is a perspective view of an example of an electrode sheet produced by a method of the present invention.

When the laser beam L1 has reached the point P4, the laser beam L1 returns to a point P5 that is a return end point in the direction opposite to that of the movement of the ear portion 1b, by a distance equal to the movement amount of the ear portion 1b, while the movement of the ear portion 1b is taken into consideration (this movement line N is indicated by (4)). The returning direction is parallel to the side end edge 4a of the ear portion 1b. Accordingly, the rectangular or square tab 5 as shown in the enlarged view of FIG. 4 is cut out in the ear portion 1*b*. Since the laser emission device 50 is of a galvano mirror type, the emitting direction of the laser beam L1 can be freely controlled. Thus, the tab 5 is not limited to a rectangular or square tab, and can be freely cut out into a semicircular shape or another shape at the side edge of the electrode portion 1*a*.

FIG. 6 illustrates the above operation, and shows that the fusion-cutting line Sy perpendicular to the electrode portion 1*a* is formed by combination of movement of the ear portion 1*b* and oblique movement of the laser beam L1.

The second laser emission device 60 is installed immediately in front of the upper take-up roller 30*a* and directly above the electrode portion 1*a* in the cutting region. In this case, the electrode portion 1*a* is merely cut at a predetermined interval at a right angle relative to the electrode portion 1*a*, whereby the electrode sheet 3 is formed. Thus, the second laser beam L2 is caused to slightly obliquely run from one edge to the other edge of the electrode portion 1*a* in synchronization with the running speed of the electrode portion 1*a*. Accordingly, the cutting line Sd perpendicular to the electrode portion 1*a* is formed.

The laser emission device 50' is used merely for ear portion separation and is provided as necessary. The laser emission device 50' is installed directly above the ear portion 1*b'* in which no tabs 5 are to be provided, and is configured to fixedly apply the laser beam L1' onto the ear portion 1*b'* at a portion that is very close to the electrode portion 1*a*, and the ear portion 1*b'* at the portion that is very close to the electrode portion 1*a* is separated along the electrode portion 1*a* as a result of movement of the ear portion 1*b'*.

An ear portion separation portion 70 is formed as a pair of left and right rollers in this embodiment (in this embodiment, for easy understanding, ear portion separating rollers 70 are used, but rollers may not be particularly used and slide plates on which the ear portions 1*b* and 1*b'* can pass may be used). The ear portion separating rollers 70 are installed at the downstream side of irradiation points Pm and Pm' of the first laser beams L1 and L1' and at positions higher (or lower) than a moving plane on which the electrode portion 1*a* that has not been cut moves. The ear portions 1*b* and 1*b'* separated at the irradiation points Pm and Pm' are taken up so as to move over the ear portion separating rollers 70. Thus, at the irradiation points Pm and Pm', a take-up angle that is an angle α occurs between the ear portions 1*b* and 1*b'* and the moving plane on which the electrode portion 1*a* moves.

The taken-up ear portions 1*b* and 1*b'* are taken up while being guided by the take-up side rollers 23*a* to 23*n*, and are respectively wound onto reels 83 and 83' of the ear portion collection portion 80 described later. A take-up side dancing roller 23*d* is provided in the middle of the take-up side rollers 23*a* to 23*n*, and the ear portions 1*b* and 1*b'* are respectively wound onto the reels 83 and 83' at fixed tension.

The ear portion collection portion 80 includes the above-described two reels 83 and 83', a reel shaft 82 connecting the reels 83 and 83', and an ear portion collecting servomotor 81, and the two reels 83 and 83' are supported by a stand that is not shown. The ear portion collecting servomotor 81 is configured to rotate in synchronization with the feed side servomotor 11. In the case where the ear portion 1*b* is present only at one side, the reel 83' is not used.

The electrode sheet collection portion 90 is installed in corresponding relation to the guide roller 30*n*, which is the exit side of the above-described take-up portion 30, has a box shape that is open at the upper surface thereof, and is configured, for example, such that discharged electrode sheets 3 are stacked and collected therein. When the electrode sheets 3 fill the electrode sheet collection portion 90, the filled electrode sheet collection portion 90 is moved and replaced with an empty electrode sheet collection portion 90.

Next, operation of the apparatus 100 of the first embodiment will be described. The original sheet 1 is mounted on the original sheet feeding shaft 12 as shown in FIG. 1, both ear portions 1*b* and 1*b'* at a leading end portion of the original sheet 1 are wound on the reels 83 and 83', and the electrode portion 1*a* is arranged immediately in front of the cutting line Sd through the feed side rollers 13*a* to 13*n*. When the apparatus 100 is actuated in this state, the feed side servomotor 11 operates to feed the original sheet 1 at a predetermined speed. At the same time, the original sheet feeding servomotor 13*s* operates to feed the original sheet 1 nipped between the original sheet feeding rollers 13*j* and 13*k*, in the direction toward the cutting line Sd. Since the original sheet side dancing roller 13*d* is provided between the feed side servomotor 11 and the original sheet feeding rollers 13*j* and 13*k*, the original sheet 1 is constantly supplied to the original sheet feeding rollers 13*j* and 13*k* at fixed tension.

Onto the original sheet 1 fed from the original sheet feeding rollers 13*j* and 13*k*, the laser beams L1 and L1' are applied at predetermined positions on the ear portions 1*b* and 1*b'* (here, the vicinities of the side edges of the electrode portion 1*a*) by the operating first laser emission devices 50 and 50'. The first laser emission device 50 separates the ear portion 1*b* from the electrode portion 1*a* while cutting out a tab 5 from the ear portion 1*b* by moving the laser beam L1.

Meanwhile, since the laser emission device 50' is fixed, the laser emission device 50' separates the ear portion 1*b'* from the electrode portion 1*a* without changing the ear portion 1*b'*.

Rollers 13*m* and 13*n* for holding only the electrode portion 1*a* are installed at the downstream side of the original sheet feeding roller 13*j* and in corresponding relation to irradiation points Pm and Pm' of the laser beams L1 and L1'. As described above, the ear portions 1*b* and 1*b'* are fed so as to move over the ear portion, separating rollers 70, which are provided at positions away from a running plane on which the electrode portion 1*a* runs, and the electrode portion 1*a* is held by the rollers 13*m* and 13*n*. Accordingly, a separation angle α is effectively formed between the electrode portion 1*a* and the ear portions 1*b* and 1*b'* at the irradiation points Pm and Pm' of the laser beams L1 and L1', so that the ear portions 1*b* and 1*b'* are assuredly separated from the electrode portion 1*a* when melting occurs at the irradiation points Pm and Pm' of the laser beams L1 and L1' (the rollers 13*m* and 13*n* are not necessarily needed, but if the rollers 13*m* and 13*n* are provided, the electrode portion 1*a* is held on the running plane even when the ear portions 1*b* and 1*b'* are raised, so that the above separation is more assured). The separated ear portions 1*b* and 1*b'* are wound onto the reels 83 and 83' through the above route. During this period, the separated ear portions 1*b* and 1*b'* are wound at tension that is set by the take-up side dancing roller 23*d*. Thus, breakage is minimized in the middle of work.

Meanwhile, the leading end of the electrode portion 1*a* from which the ear portions 1*b* and 1*b'*'s have been separated is fed by the original sheet feeding rollers 13*j* and 13*k*, reaches the take-up portion 30 through the rollers 13*m* and 13*n*, and becomes nipped between the take-up rollers 30*a* and 30*b*. As described above, the take-up rollers 30*a* and 30*b* rotate slightly faster than the original sheet feeding rollers 13*j* and 13*k* before nipping the leading end of the electrode portion 1a. After the leading end of the electrode portion 1a is nipped therebetween, the take-up rollers 30a and 30b idle with set resistance relative to the rotation shaft of the take-up servomotor 30s to apply tension T in the feed direction to the electrode portion 1a between the original sheet feeding rollers 13j and 13k and the take-up rollers 30a and 30b.

In this state, at the time when the electrode portion 1a is fed by a predetermined distance, the second laser beam L2 is caused to slightly obliquely run in synchronization with the running speed of the electrode portion 1a to cut the electrode portion 1a at a right angle. At this time, since the tension T is applied to the electrode portion 1a as described above, the electrode portion 1a is separated so as to be torn at the irradiation point of the second laser beam L2 simultaneously with melting. Cutting of the electrode portion 1a is performed at a predetermined interval. Thus, electrode sheets 3 with tabs 5 are continuously cut out. The cut-out electrode sheets 3 with the tabs 5 are sequentially fed by the guide rollers 30c to 30n described subsequently to the take-up rollers 30a and 30b, and are stored in the electrode sheet collection portion 90, which is provided below the take-up portion 30.

With the apparatus 100 of the present invention, the electrode sheet 3 with the tab 5 shown in FIG. 4 is efficiently produced from the moving original sheet 1 as described above.

Figure 7:
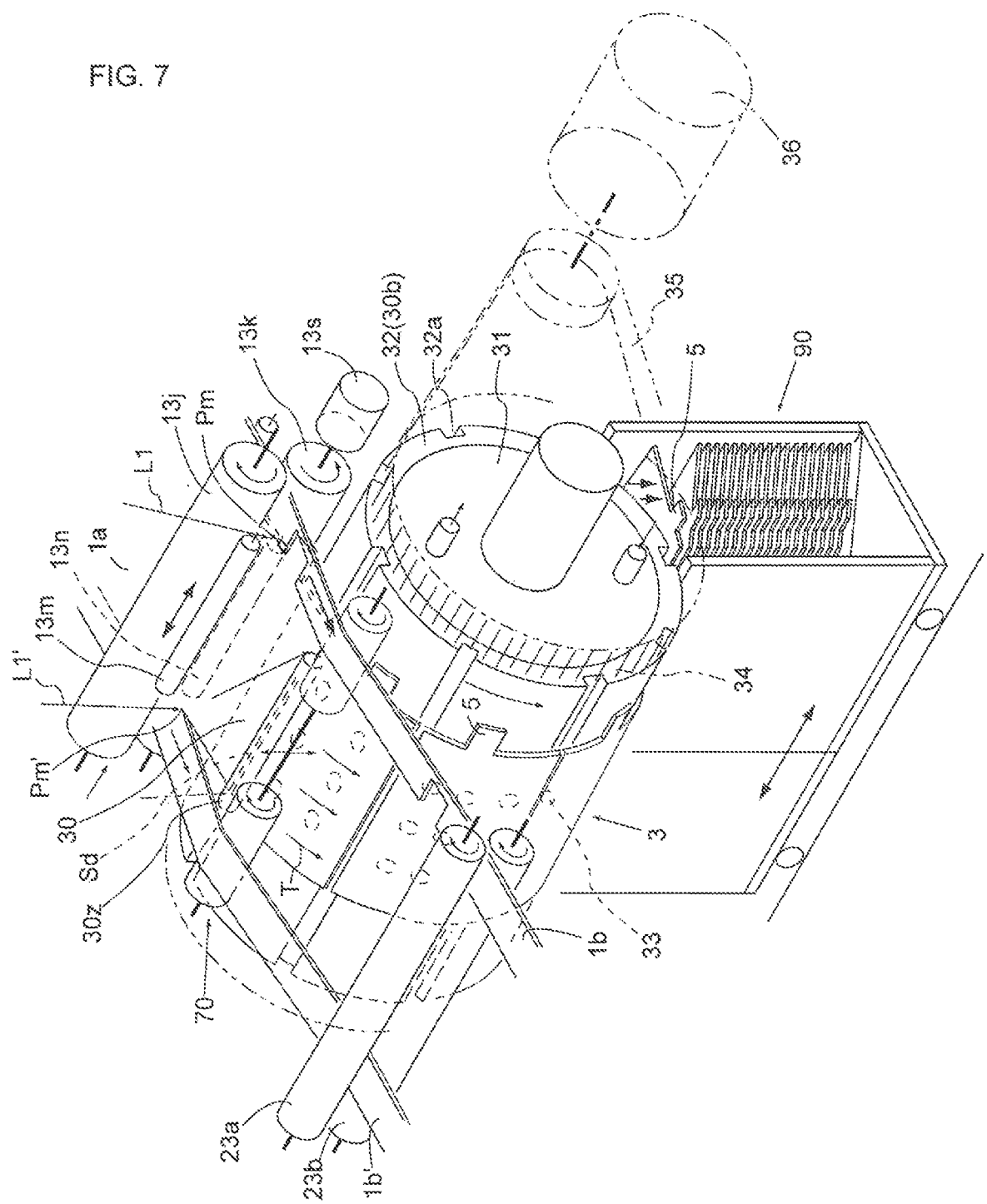
FIG. 7 is a cross-sectional view of a main part of a second embodiment of the take-up portion of the present invention.
Figure 8:
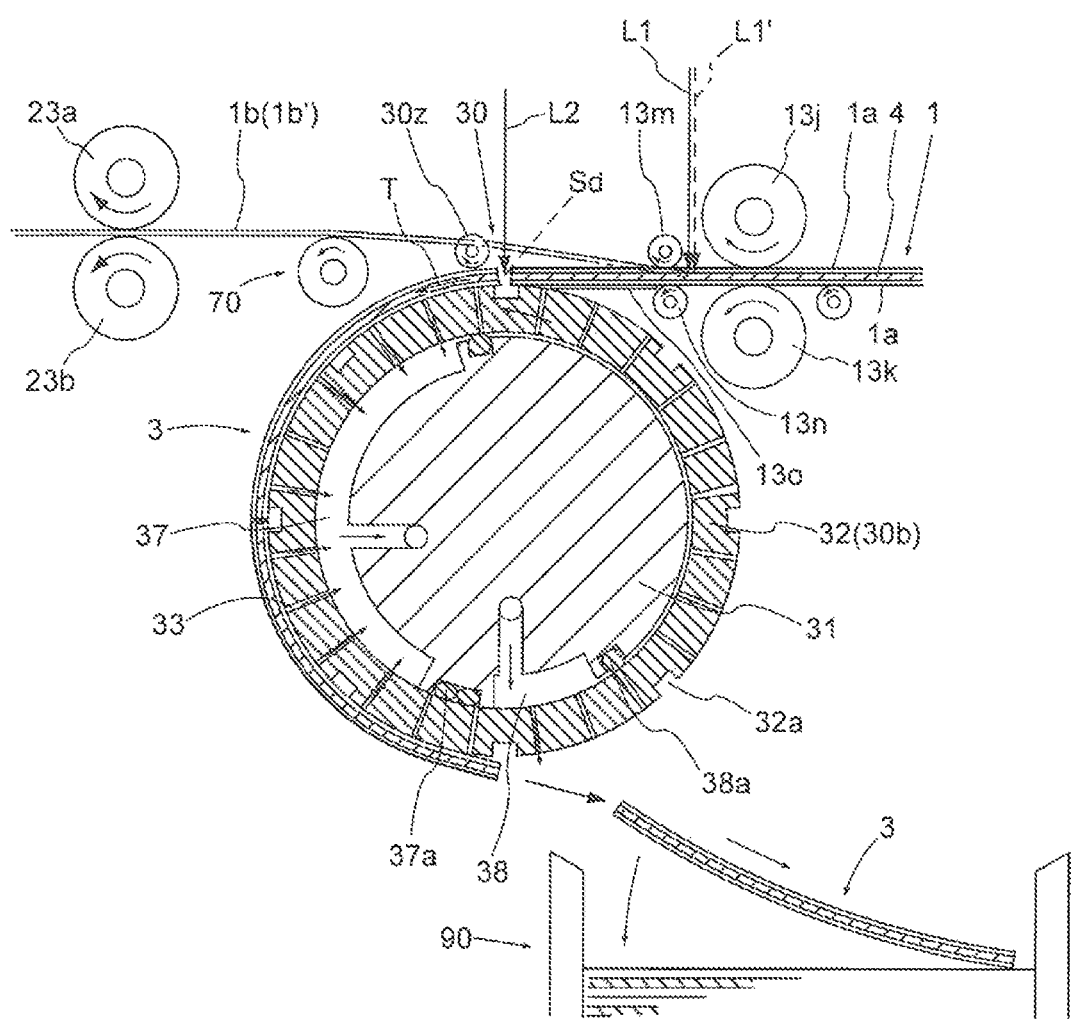
FIG. 8 is a longitudinal cross-sectional view of the take-up portion shown in FIG. 7, in a right angle direction.

Next, the suction drum type that is another embodiment of the take-up portion 30 will be briefly described. This type includes a cylindrical fixed drum 31 that is horizontally suspended and fixed by the apparatus frame so as to be perpendicular to the feed direction of the original sheet 1, and a rotary tubular body 32 that rotates around the fixed drum 31 with a bearing interposed therebetween. A larger number of laser running grooves 32a are provided on the outer circumferential surface of the rotary tubular body 32 at equal intervals (at equal angles when see from the front of the take-up portion 30 shown in FIG. 7) so as to extend from one end of the rotary tubular body 32 to the other end of the rotary tubular body 32, and a large number of air holes 33 are bored in the entire rotary tubular body 32 at positions avoiding the laser running grooves 32a. The air holes 33 penetrate from the inner circumferential surface of the rotary tubular body 32 to the outer circumferential surface of the rotary tubular body 32. A timing pulley 34 is fixed to at least one side portion of the rotary tubular body 32, and a timing belt 35 is trained over the timing pulley 34 and a collecting servomotor 36, which is installed in the apparatus frame, such that the rotary tubular body 32 is rotated.

The rotation speed of the rotary tubular body 32 is set such that the rotary tubular body 32 rotates slightly faster than the original sheet feeding speed of the original sheet feeding rollers 13j and 13k.

In the suction drum type, the cut electrode sheet 3 has to be sucked and moved, and the electrode sheet 3 has to be put into the electrode sheet collection portion 90, which is provided at the lower side. Thus, it is necessary to emit air from the air holes 33 immediately in front of the electrode sheet collection portion 90, so that ii is necessary to provide a pressure-reducing suction region and an air emission region on the basis of location. Accordingly, a pressure-reduction recess 37 is formed on the outer circumferential surface of the fixed drum 31 so as to extend in the rotation direction of the rotary tubular body 32 from a position on the rotary tubular body 32 corresponding to the cutting line Sd of the electrode sheet 3 to a position that is at the lower end of the fixed drum 31 and immediately in front of the electrode sheet collection portion 90. A space formed by the pressure-reduction recess 37 and the inner circumferential surface of the rotary tubular body 32 is defined as a pressure-reduction space, an O-ring groove is formed around the recess 37, and a pressure-reduction O-ring 37a is fitted in the O-ring groove so as to be hermetically in slide contact with the inner circumferential surface of the rotary tubular body 32.

A pressurization recess 38 is further formed at the downstream side of the recess 37, a space formed by the pressurization recess 38 and the inner circumferential surface of the rotary tubular body 32 is defined as a pressurization space, and similarly a pressurization O-ring 38a is hermetically fitted around the pressurization recess 38. The pressure-reduction space and the pressurization space are connected to a suction source and a pressurization source, respectively.

A driven-type take-up roller 30z is installed above the rotary tubular body 32 so as to be parallel to the rotary tubular body 32, and is configured to nip the leading end of the fed electrode portion 1a together with the rotary tubular body 32. The rotary tubular body 32 corresponding to the take-up roller 30z is a start point of the pressure-reduction space, and the nipped electrode portion 1a is assuredly sucked by the air holes 33 of the rotary tubular body 32.

Then, the nipped electrode portion 1a is cut with the second laser beam L2 similarly as described above. The cutting is performed at a position corresponding to the laser running groove 32a of the rotary tubular body 32. The electrode sheet 3 cut with a predetermined length is moved halfway around a circle by the rotary tubular body 32 rotating around the fixed drum 31, and the air holes 33 become connected to the pressurization space immediately before the electrode sheet collection portion 90, and the electrode sheet 3 is separated from the rotary tubular body 32 by air emitted from the air holes 33, and is stored in the electrode sheet collection portion 90.

Here, the cutting of the electrode portion 1a will be described. Since the rotary tubular body 32 rotates at a speed slightly faster than the feed speed of the electrode portion 1a, the rotary tubular body 32 cooperates with the take-up roller 30z to generate tension T in the electrode portion 1a. At this time, the electrode portion 1a is not stretched by the tension T, and thus the electrode portion 1a slips relative to the rotary tubular body 32. In addition, to ensure the electrode portion 1a is adhered by suction to the rotary tubular body 32, the surface of the electrode portion 1a is preferably coated with a rubber material.

Next, the second embodiment of the apparatus 100 will be described. In this case, the original sheet 1 is a double-wide original sheet having ear portions 1b at both sides thereof, and first laser emission devices 50a and 50b for forming tabs 5 in the ear portions 1b at both sides are installed at the left and right sides of the ear portion separating region. A third laser emission device 65 for dividing the original sheet 1 at the center thereof is installed between the first laser emission devices 50a and 50b. In the cutting region, second laser emission devices 60a and 60b for cutting are installed at the left and right sides of a region above the electrode portion 1a, since the original sheet 1 is wide. As a matter of course, only one second laser emission device for cutting may be installed if the cutting width of a laser is sufficient.

In the second embodiment, the original sheet feeding rollers 13j and 13k are installed at the downstream side of the ear portion separating region, and each have a length enough to nip only the electrode portion 1a (as a matter of course, as in the first embodiment, the original sheet feeding rollers 13j and 13k may be provided at the upstream side of the ear portion separating region and each have a length enough to nip the entire width of the original sheet 1).

Two pairs of upper and lower rollers 13e and 13f and 15a and 15b for nipping the entire width of the original sheet 1 are provided between the original sheet feeding rollers 13j and 13k and the original sheet side dancing roller 13d, and a pair of left and right separating rollers 14a and 14b serving as a separating portion 14 are provided between the two pairs of upper and lower rollers 13e and 13f and 15a and 15b. An irradiation point Pc of a third laser beam L3 is set immediately in rear of the rollers 13e and 13f at the upstream side.

Figure 10:
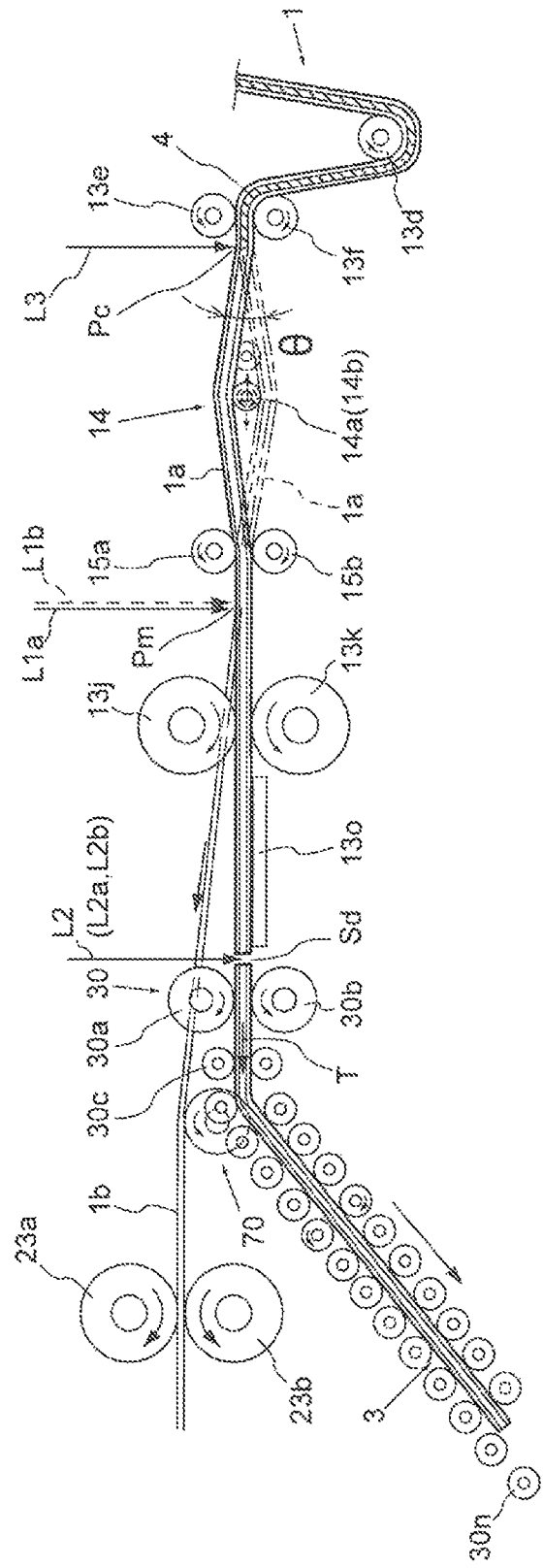
FIG. 10 is a longitudinal cross-sectional view of FIG. 9 in a right angle direction.

As shown in FIGS. 9 and 10, the separating rollers 14a and 14b are coaxial with each other and configured to rotate in directions opposite to each other, and one half-wide original sheet 1 obtained by lateral division into two sections with the third laser beam L3 passes below the separating roller 14a, and the other half-wide original sheet 1 obtained thus passes above the other separating roller 14b. The respective separating rollers 14a and 14b are mounted at the same height, and the left and right half wide original sheets 1, 1 are separated vertically at the irradiation point Pc by the separating rollers 14a and 14b. The angle of the separation is θ. The separating portion 14 is movable forward and rearward, and the angle θ increases as the separating portion 14 comes closer to the rollers 13e and 13f at the upstream side.

Similarly as in the first embodiment, when the apparatus 100 is actuated, first, the original sheet 1 coming out from the rollers 13e and 13f at the upstream side are laterally divided into two sections with the third laser beam L3. At this time, the left and right half-wide original sheets 1, 1 are separated vertically at the irradiation point Pc, and thus are not fused to each other due to resolidification. The left and right half-wide original sheets 1, 1 having been separated vertically and having passed through the separating portion 14 are nipped between the rollers 15a and 15b at the downstream side to return to the same running height, and reach the next ear portion separating region. In the ear portion separating region, tabs 5 are cut out from the left and right ear portions 1b with left and right first laser beams L1a and L1b by the same action as in the first embodiment, and the left and right ear portions 1b are separated from the electrode portion 1a at the same time.

The left and right electrode portions 1a, 1a from which the ear portions 1b have been separated are sent to a take-up portion 30 at a predetermined speed through the original sheet feeding rollers 13j and 13k, are cut by the same action as in the first embodiment, and are collected. Accordingly, in the second embodiment, two electrode sheets 3 are produced.

In this case, the other configuration is the same as in the first embodiment, and each of the laser emission devices 60a and 60b for cutting and the third laser emission device 65 for division into two sections may emit a branch single mode laser beam. However, when thermal effects on the active material during cutting are taken into consideration, a green laser (second to fourth harmonic laser), a picosecond laser, or a femtosecond laser is preferable as the laser beam L2a, L2b, or L3 of each of the laser emission devices 60a and 60b and the third laser emission device 65.

REFERENCE SIGNS LIST 1 original sheet
1a electrode portion
1b, 1b' ear portion
3 electrode sheet
4 metal foil
4a one side end edge
5 tab
10 original sheet supply portion
11 feed side servomotor
12 original sheet feeding shaft
13a to 13n feeding roller
13d original sheet side dancing roller
13j, 13k original sheet feeding roller
13o support plate
13s original sheet feeding servomotor
14 separating portion
14a, 14b separating roller
15a, 15b roller
23a to 23n take-up side roller
23d take-up side dancing roller
30 take-up portion
30a, 30b, 30z take-up roller
30c to 30n guide roller
30s take-up servomotor
31 fixed drum
32 rotary tubular body
32a laser running grooves
33 air holes
34 timing pulley
35 timing belt
36 collecting servomotor
37 pressure-reduction recess
37a pressure-reduction O-ring
38 pressurization recess
38a pressurization O-ring
40 torque limiter
41 rotation plate
45 casing
46, 47 permanent magnet
50, 50a, 50b first laser emission device (for tab formation)
50' laser emission device for ear portion separation
60, 60a, 60b second laser emission device (for cutting)
65 third laser emission device (for division into two sections at center)
70 ear portion separating portion (ear portion separating roller)
80 ear portion collection portion
81 ear portion collecting servomotor
82 reel shaft
83, 83' reel
90 electrode sheet collection portion
100 tabbed electrode sheet producing apparatus
L1, L1', L1a, L1b, L2, L2a, L2b, L3 laser beam
N movement line of laser beam
P, P1 movement start point
P2 to P5 direction change point
Pc irradiation point (at center portion)
Pm, Pm' irradiation point (at ear portion)
Sd cutting line
Sy fusion-cutting line
T tension

The invention claimed is:

1. A tab forming apparatus in a tabbed electrode sheet producing apparatus for moving, in one direction, an original sheet including an electrode portion and an ear portion, the tab forming apparatus comprising:
a laser emission device configured to apply a laser beam to the moving ear portion to cut out a tab connected to the electrode portion and to separate the ear portion from the electrode portion, wherein the ear portion, from which the tab has been cut out, is separated as a long strip-shaped ear portion;

an ear portion separating portion provided at a position above or below a moving plane on which the electrode portion moves, on a downstream side of an irradiation point of the laser beam applied to cut out the tab; and an ear portion collection portion configured to collect the long strip-shaped ear portion in synchronization with the movement of the original sheet, while applying tension to the long strip-shaped ear portion that has been separated from the electrode portion, wherein the electrode portion is a portion of a long metal foil to which an active material layer is applied along a longitudinal direction of the long metal foil, the ear portion is a portion of the long metal foil to which the active material layer is not applied, and the ear portion is formed between the electrode portion and a side end edge of the metal foil, and when the long strip-shaped ear portion that has been separated from the electrode portion while the tab is being cut out from the ear portion with the laser beam is taken up so as to move over the ear portion separating portion, a non-zero take-up angle occurs at the irradiation point between the moving plane of the electrode portion and the long strip-shaped ear portion so as to physically separate the long strip-shaped ear portion from the electrode portion at the irradiation point.

* * * * *